United States Patent
Muramatsu et al.

[11] Patent Number: 5,879,175
[45] Date of Patent: Mar. 9, 1999

[54] LOADING/UNLOADING UNIT FOR CARD MEDIA

[75] Inventors: Hidenori Muramatsu, Yokohama; Hiroto Handa, Tochigi; Hiroyuki Umezawa; Makoto Hamada, both of Saitama, all of Japan

[73] Assignee: The Whitaker Corporation, Wilmington, Del.

[21] Appl. No.: 973,419

[22] PCT Filed: Apr. 19, 1996

[86] PCT No.: PCT/US96/05513

§ 371 Date: Oct. 20, 1997

§ 102(e) Date: Oct. 20, 1997

[87] PCT Pub. No.: WO96/34427

PCT Pub. Date: Oct. 31, 1996

[51] Int. Cl.⁶ .................................................. H01R 13/62
[52] U.S. Cl. ........................................... 439/159; 235/479
[58] Field of Search ..................................... 439/152, 155, 439/157, 159, 327; 235/479, 440, 492, 493

[56] References Cited

U.S. PATENT DOCUMENTS 4,833,310  5/1989  Shimamura et al. ................... 235/479

FOREIGN PATENT DOCUMENTS

AO232115  8/1987  European Pat. Off. .
A0363992  4/1990  European Pat. Off. .
WOA9427343  11/1994  WIPO .

*Primary Examiner*—Neil Abrams
*Assistant Examiner*—Barry M. L. Standig
*Attorney, Agent, or Firm*—Katherine A. Nelson; Anton P. Ness

[57] ABSTRACT

A card (12) is inserted by pushing against a rubber roller (44) at the leading end of the card (12). The action of the rubber roller (44) pivots an actuation lever (24) to actuate a switch (36), which, in turn, starts a motor (16). The card (12) is moved inwardly by the rotation of the rubber roller (44) thereby pushing the card against support legs (62) causing a pinion (58) to engage with a rack (56) mounted on a card holder (48). The card holder (48) then holds the card (12) and is driven by the pinion (58) causing hook portions (84a, 84b) of pushing arms (72a, 72b) to engage the trailing edge (12b) of the card (12) thereby connecting the card (12) with contact pins (22) of an electrical connector (20) by pushing the card at its trailing edge.

12 Claims, 3 Drawing Sheets

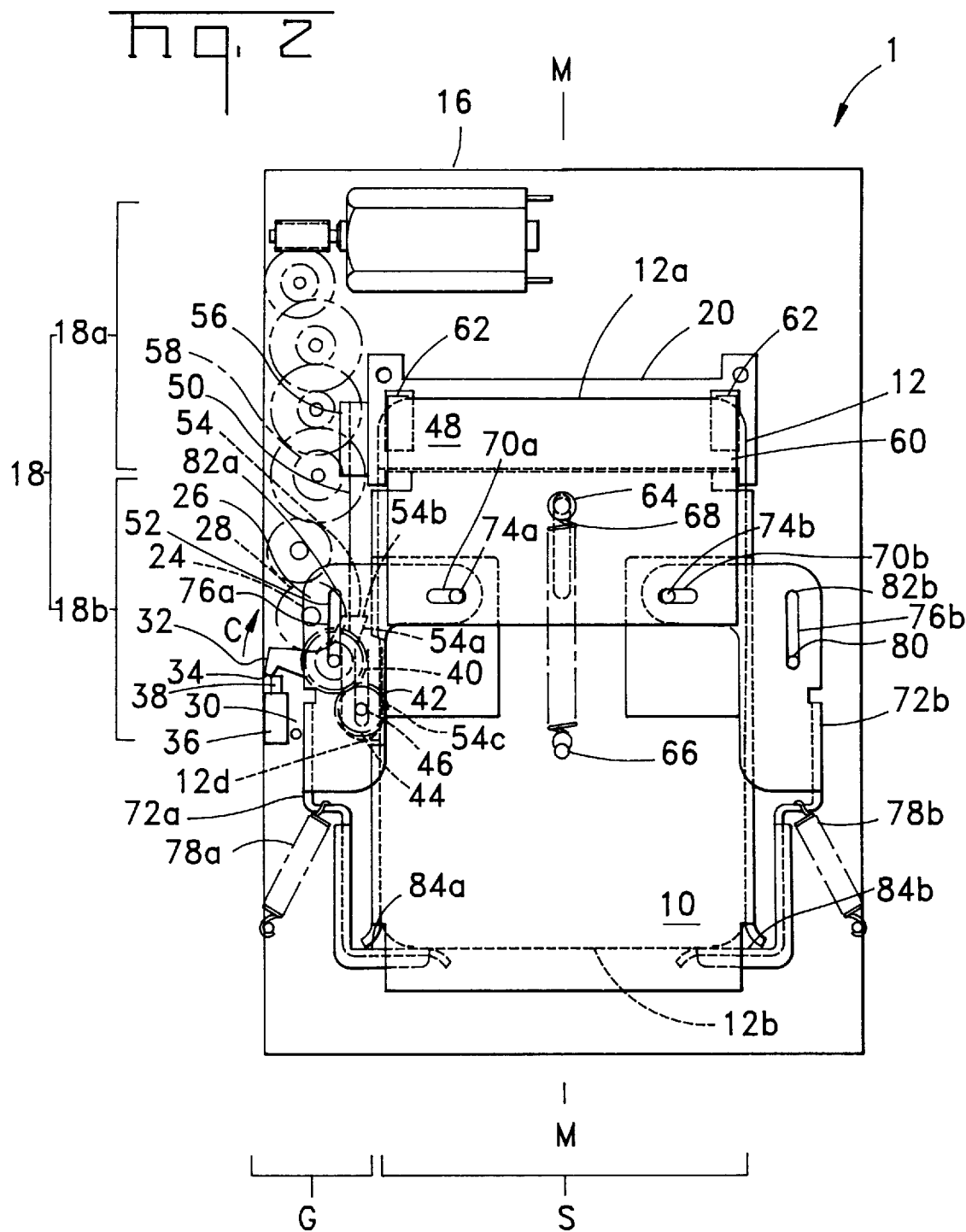

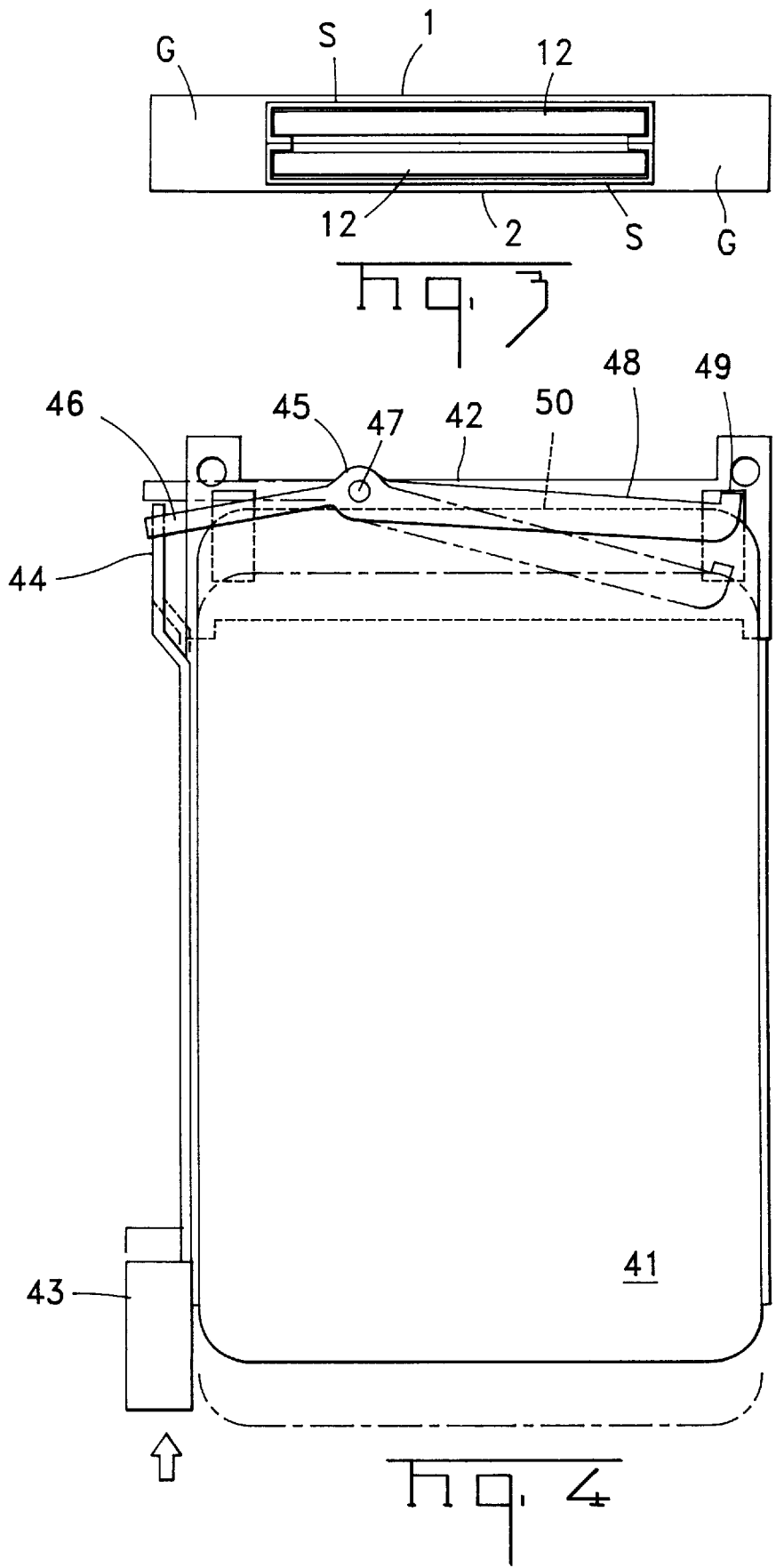

LOADING/UNLOADING UNIT FOR CARD MEDIA

FIELD OF THE INVENTION

The present invention relates to a loading/unloading unit for card media or IC card (referred simply to as "card" hereunder) in a read/write device of a personal computer or the like, more specifically to an electrical powered loading/unloading unit for inserting or ejecting a card into or out of a connector within the read/write device by electrical power.

BACKGROUND OF THE INVENTION

Generally, it is conventional to load (insert) and unload (eject) a card in a personal computer or the like by manual means. In the case of loading a card in a connector, a user uses fingers to push a card 41 into a connector 42 for making electrical connection as shown in FIG. 4. On the other hand, in the case of unloading the card 41, an ejection lever 43 is depressed in the direction of an arrow, which in turn pushes one end 46 of an ejection arm 45 by an end portion 44 of the ejection lever 43, which in turn causes the ejection arm 45 to pivot clockwise about a shaft 47. A projection 49 at the other end 48 of the ejection arm 45 abuts against an insertion edge 50 of the card 41, thereby pushing it in the direction to eject the card 41 from the connector 42 as shown by a double-chain line.

Unfortunately, however, such a conventional manual loading/unloading mechanism has a security problem because even a card containing data of confidential nature can be freely ejected by simply actuating the ejection lever by anybody and at any time. Also, the ejection may be effected while the computer is accessing the card, thereby destroying the data in the card and the computer. Additionally, the card loading stroke is large and there requires a relatively large insertion force to the connector. In other words, relatively poor feeling to the operator to indicate when the card is fully inserted or loaded along with a possible biased force to the card tends to accompany an unduly strong force to be applied to the card, which may break or damage the card. It is therefore a feature of the present invention to provide a unit capable of loading and unloading a card reliably and smoothly by electrical power.

EP-A-0,232,115 discloses an electrically powered loading/unloading unit including a feed roller and a card holder with a rack. The roller and rack are operated by a rotary driving means energized by a separate sensor. WO 94/27343 discloses the use of a solenoid to operate a locking means to secure a card in a manually operated loading/unloading unit.

SUMMARY OF THE INVENTION

In order to achieve an electrically powered unit for reliably and smoothly loading and unloading a card, the present invention provides pushing arms pivotally disposed adjacent to a card moving path in an engagable relationship with a card, a feeding roller rotating in abutment against a side surface of the card, and an actuation lever pivotally supported to a shaft of a rotary driving means of the feeding roller and operating by resilient means to push the feeding roller against the side surface of the card and in ganged manner with a switch.

Further provided are a gear train to transmit an electrical driving force to the rotary driving means and a card holder slidable in the card moving direction. The card holder includes card support legs to abut against the card to be loaded, a rack to engage the gear train, and cam means in engagement with an extended portion of the rotary shaft of the feeding roller. Also provided is resilient means for biasing the card holder in the unloading direction. The pushing arms and the card holder are coupled to each other so that the pushing arms operate in accordance with the movement of the card holder.

Presently, at least the pushing arms, the feeding roller and the driving force transmission gear train are disposed at one side of the centerline of the card moving path, the direction of rotation of the feeding roller is chosen to be the same as that of the pinion to mate with the rack of the gear train, and the feeding roller is chosen to rotate faster than the pinion in the circumferential rotary speed.

The present invention having the aforementioned configuration operates as follows. The pushing arms engage the trailing edge of the card to feed it into the connector in the read/write device when pushed at the rear end. After loading into the connector, the pushing arms remain engaged at the trailing edge to prevent the card from being rejected.

In other words, at the initial stage of the loading, the card to be inserted abuts against the feeding roller at the side surface thereof. The card pivots the actuation lever against the resilient means to actuate the switch which initiates the driving electrical power to be transmitted to the feeding roller by way of the gear train. The card is moved toward the connector by the rotary force of the feeding roller and abuts against the card support legs at the leading edge of the card to move the card holder.

Since the mounted rack engages the pinion of the gear train by the movement of the card holder, the card holder receives the driving force directly from the pinion for the movement. At this time, the cam means engaging the extension portion of the feeding roller acts to separate the feeding roller from the side surface of the card.

As the card holder moves, the pushing arms pivoted to engage the trailing edge of the card holds the card at the rear end of the card so as to move as a unit with the card holder and ultimately pushes the card into the connector.

Ejection of the card can be effected by moving the gear train in the opposite direction. The pinion, then, drives the rack to move the card holder in the ejecting direction. The card support legs holding the insertion edge of the card move free of the card to eject or extract it from the connector.

Also, by the time when the engagement between the rack and the pinion is released, the pushing arms move with the movement of the card holder to release engagement with the card by pivoting away from the moving path of the card. On the other hand, the feeding roller controlled by the cam means engages the side surface of the card. The resilient means to operate the card holder in the ejecting direction assists disengagement between the rack and the pinion and also reliable engagement between the feeding roller and the side surface of the card.

The feeding roller brought into an engagable condition with the side surface of the card is driven in the reverse direction to apply pressure to the card side surface by the resilient means of the actuation lever to move the card in the ejecting direction. When the card is ejected to a predetermined position, the feeding roller is set completely free to pivot the actuation lever to actuate the switch which stops operating the gear train.

If the pushing arms, the feeding roller and the driving force transmission gear train are disposed at one side of the centerline of the card moving path, a pair of identical units for a pair of cards can be stacked in a back-to-back relationship or an axial symmetry. Also, if the feeding roller and the pinion are chosen to rotate in the same direction to each other with the feeding roller rotating at a faster circumferential speed than the pinion, the pinion and the rack can be engaged and disengaged with a high degree of reliability, thereby enabling smooth switching from the high speed, low torque driving by the feeding roller to the low speed, high torque driving by the pinion.

Now, one embodiment of the loading/unloading unit of card media according to the present invention will be described by reference to the accompanying drawings.

BRIEF DESCRIPTION OF THE DRAWINGS

FIG. 2 is a plan view of the unit in FIG. 1 in the fully loaded mode of the card media into the connector.

FIG. 3 is a simplified front view along the line 3—3 in FIG. 1.

FIG. 4 is a plan view of a conventional loading/unloading unit for card media.

DETAILED DESCRIPTION OF AN EMBODIMENT OF THE INVENTION

Figure 1:
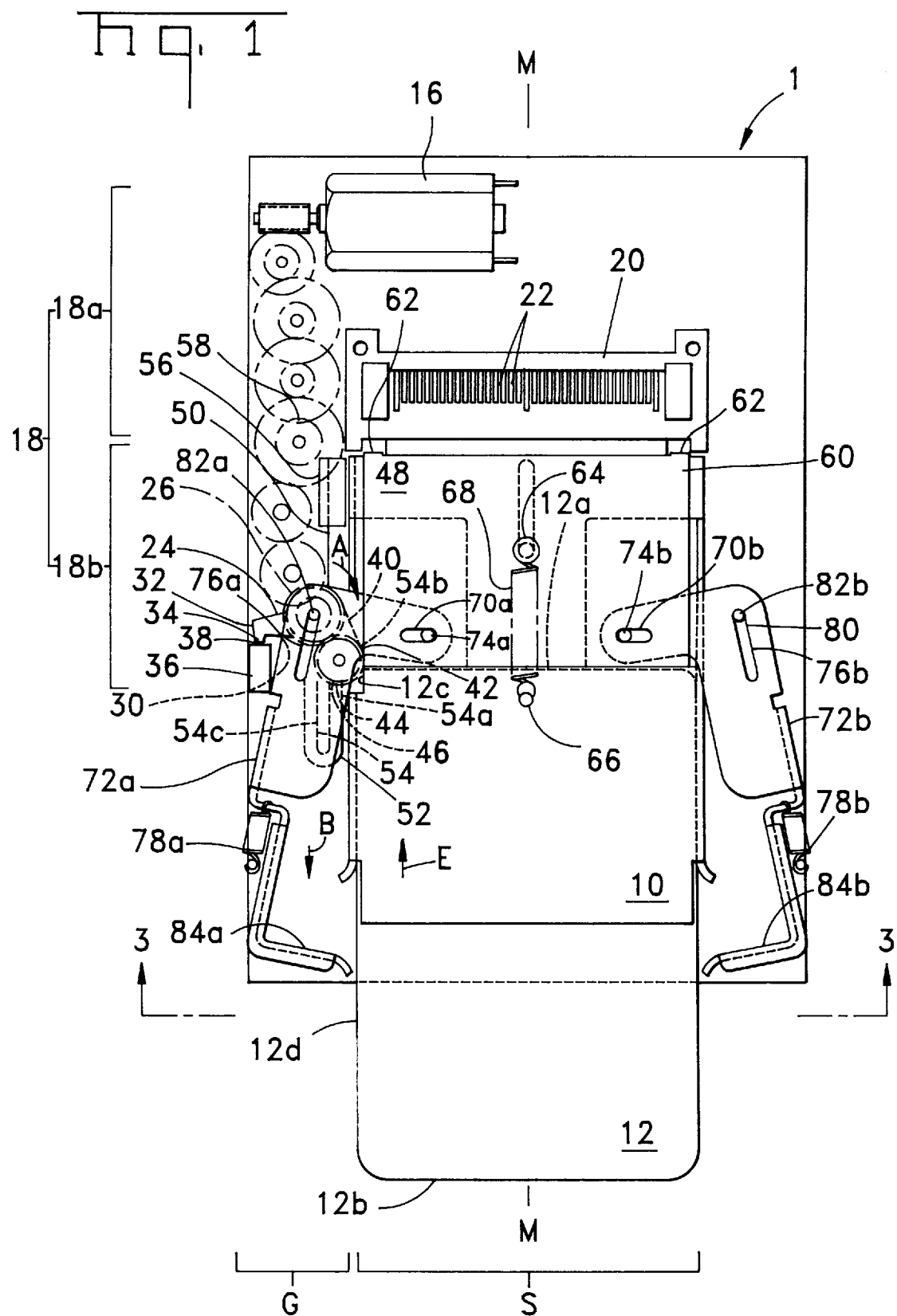
FIG. 1 is a plan view of one embodiment of the loading/unloading unit for card media according to the present invention in the modes of fully loading and unloading the card media.

Shown in FIG. 1 is a simplified plan view of major parts of the mechanism of an embodiment of the present invention. In this embodiment, a card 12 manually brought to a guide 10 at the insertion edge 12a is electrically inserted to engage contact pins 22 of a connector 20 by a motor 16 by way of gear train 18.

Represented by a reference numeral 24 is an actuation lever pivotally supported to a rotary shaft 28 of a driving gear 26 in a coaxial manner. The actuation lever 24 is biased counter-clockwise (in the direction of an arrow A in FIG. 1) for normally applying pressure to an actuator 38 of a switch 36 by an action member 34 of one arm 32 of actuation lever 24 by using a coil spring 30. Rotatably mounted at the other arm 40 of the actuation lever 24 is a rubber roller 44 which is driven to rotate by a gear 42 engaging the driving gear 26.

Also, the rubber roller 44 is biased by the coil spring 30 to extend into the moving path of the card 12 so as to engage therewith. The rotary shaft 46 of the rubber roller 44 has an extended portion to engage a cam groove 54 in an arm 52 extending at a side portion of a bottom plate 50 of a card holder 48 so that the actuation lever 24 pivots as the cam groove 54 moves.

Mounted on the bottom plate 50 of the card holder 48 is a rack 56 in engagement with a pinion 58. Represented by 60 is an upper plate 50 by way of card support legs 62, 62 for supporting the leading or insertion end 12a of the card 12. The card holder 48 is biased in the card ejecting direction (shown by an arrow B) by a coil spring 68 between pins 64, 66 mounted on the upper plate 60 and the guide 10, respectively. Formed in the upper plate 60 are elongate holes 70a, 70b for slidably receiving action pins 74a, 74b of the pushing arms 72a, 72b, respectively.

The pushing arms 72a, 72b are formed with elongate grooves or slots 76a, 76b and are biased in the ejection direction (arrow B) by coil springs 78a, 78b, respectively. Inserted in the elongate grooves 76a is an extension portion of the rotary shaft 28 of the driving gear 26. On the other hand, inserted in the elongate groove 76b is a fixed shaft 80. Accordingly, the pushing arms 72a, 76b are pivotally supported by the rotary shaft 28 and the fixed shaft 80 at one end 82a, 82b in the elongate grooves 76a, 76b and biased outwardly by the spring force of the coil spring 78a, 78b, respectively. Also, the pushing arms 72a, 72b are slidable along the rotary shaft 28 and the fixed shaft 80. Represented by 84a, 84b are hook portions which are integral parts of the pushing arms 72a, 72b and engagable with the trailing edge 12b of the card for cradling the card 12.

The gear train 18 comprises a speed decreasing gear train 18a from an output shaft of the motor 16 to the pinion 58 and a speed increasing gear train 18b from the pinion 58 to the driving gear 26. For example, the pinion 58 and the rubber roller 44 rotate in the same direction in such a manner that the rubber roller 44 has a faster circumferential speed than the pinion 58 and they are disposed at one side with respect to the centerline M—M of the card moving path.

In this embodiment as shown in FIGS. 1–3, a first unit 1 and a second unit 2 are identical to each other and stacked in a back-to-back manner to provide an axial symmetrical configuration for a pair of cards. However, it is to be noted that the present invention is not limited to such particular configuration. Shown in FIG. 3 is a simplified view along the line 3—3 in FIG. 1, wherein represented by reference symbols S and G are a cold holder (retaining compartment) and a driving mechanism, respectively.

Now, operation of the loading/unloading unit for card media in the above embodiment will be described in detail. In FIG. 1, the card 12 is inserted into the entrance of the guide 10 at the insertion edge 12a. The rubber roller 44 engaging a corner 12c of the card 12 is depressed against the spring force of the coil spring 30. The actuation lever 24 rotates clockwise (shown by an arrow C) so that the action member 34 releases the actuator 38. Then, the switch 36 operates to drive the motor 16. The driving force of the motor 16 is transmitted to the rubber roller 44 by way of the pinion 58.

Initially, the rubber roller 44 rotates counter-clockwise (arrow A). Since the outer periphery of the rubber roller 44 is pushed against the side edge 12d of the card 12 by the coil spring 30, frictional force between the rubber roller 44 and the side surface of the card 12 moves the card 12 in the insertion direction (arrow E) toward the connector 20 as the rubber roller 44 rotates. When the leading edge 12a of the card 12 reaches the card support legs 62, the card 12 moves along with the card holder 48.

The rack 56 mounted on the bottom plate 50 of the card holder 48 then engages the pinion 58 whereby the card 12 is disposed between the bottom plate 50 and the upper plate 60 of the card holder 48, thereby causing the card 12 to move inwardly by the driving force of the pinion 58. Substantially simultaneously, the rotary shaft 46 of the rubber roller 44 is moved outwardly by a sloped side 54a of the cam groove 54 in the bottom plate 50, thereby separating the outer periphery of the rubber roller 44 from the side edge 12d of card 12. This ensures that the circumferential speed of the rubber roller 44 does not interfere with the rotation of the pinion 58. At the initial stage of switching from the high speed, low torque drive by the rubber roller 44 to the low speed, high torque drive by the pinion 58, two rotations of different speeds may overlap. However, the higher circumferential speed of the rubber roller 44 only helps quicker engagement between the rack 56 and the pinion 58 and causes no adverse effect.

As the card holder 48 moves inwardly, the action pins 74a, 74b engaging respectively the elongate holes 70a, 70b in the upper plate 60 actuate the pushing arms 72a, 72b.

Since the pushing arms 72*a*, 72*b* pivot about the respective shafts 28, 80 at the ends 82*a*, 82*b* of the elongate grooves at the initial stage of movement, the hook portions 84*a*, 84*b* are brought into engagement with the trailing edge 12*b* of the card 12.

Such engagement of the pushing arms 72*a*, 72*b* acts as the retention force for the card 12 when the freedom of rotation is lost. The pushing arms 72*a*, 72*b* slide with the shafts 28, 80 being guided along the elongate grooves 76*a*, 76*b* against the tensile force of the coil springs 78*a*, 78*b* as the card holder 48 moves, thereby moving the card 12 and the card holder 48 as a unitary member in the loading direction (arrow E). Ultimately, the driving force of the low speed, high torque pinion 58 drives the hook portions 84*a*, 84*b* of the pushing arms 72*a*, 72*b* to push the card 12 at its trailing edge 12*b* until the leading edge 12*a* is forced to be inserted into engagement with the contact pins 22 in the connector 20 to complete the connecting operation (See FIG. 2).

When a need arises to eject or unload the card 12, the motor 16 is rotated in the reverse direction from a control panel or an appropriate program. The low speed, high torque pinion 58 drives the card holder 48 in the ejecting direction (arrow B) by way of the rack 56. The card support legs 62, 62 engage the leading edge 12*a* of the card 12 to disconnect the card 12 from the contact pins 22 in the connector 20. The pushing arms 72*a*, 72*b* move the hook portions 84*a*, 84*b* engaged with the trailing edge 12*b* of the card 12 outwardly during the movement in the effective length in the elongate grooves 76*a*, 76*b*. However, when the shafts 28, 80 engage the ends 82*a*, 82*b* of the elongate grooves 76*a*, 76*b*, the movement of the card holder 48 causes the action pins 74*a*, 74*b* to slide along the elongate holes 70*a*, 70*b*, thereby pivoting the pushing arms 72*a*, 72*b*. As a result, the engagement between the pushing arms 72*a*, 72*b* with the trailing edge 12*b* of the card 12 is released to establish the moving path for the card 12.

As a result of the movement in mutual position of the rack 56 and the pinion 58 to disengage therebetween at the final stage of movement, the rotary shaft 46 of the rubber roller 44 held in the linear portion 54*c* of the cam groove 54 in the bottom plate 50 is set free by way of the sloped side 54*a* and the pocket 54*b* in the cam groove 54 by the movement of the card holder 48. The outer periphery of the rubber roller 44 is pressed against the side edge 12*d* of the card 12 by the biasing force of the coil spring 30. The coil spring 68 assists smooth switching from the low speed drive by the pinion 58 to the high speed drive by the rubber roller 44.

Subsequently, the card 12 is ejected by the rotation of the rubber roller 44 which becomes free at the complete unloaded position as illustrated in FIG. 1. The actuation lever 24 pivots by the force of the coil spring 30 and the action member 34 pushes the actuator 38 to actuate the switch 36, thereby stopping the motor 16. At this stage, the card 12 can be removed easily by hand.

As described hereinbefore, the loading/unloading unit for card media according to the present invention features in driving the card by electrical power, thereby enabling to control by software using a password, thereby providing security to any confidential information stored in the card. Also, the particular configuration of positioning the card loading/unloading mechanism on the same plane as the card enables to realize a compact design of such units for a pair of cards by disposing the mechanism at one side of the card. Additionally, the use of separate systems of different speeds for the inserting mechanism to move the card media to the front position of the connector and the driving mechanism to electrically connect the card media with the contact pins achieves a quicker insertion operation and reliable engagement with improved operational characteristics of the unit.

We claim:

1. An insertion and ejection device for inserting and ejecting a card into engagement with and out of engagement with an electrical connector comprising a card guide for receiving the card for movement along a card movement path in a card insertion direction, and an electrically powered mechanism for operating the card holder, characterized in that:

said mechanism for moving the card along the card movement path in an insertion direction is energized by the interaction of said card with a roller of said card driving mechanism, and pushing arms coupled to said card holder engage a trailing end of the card for pushing the card inwardly along the card movement path until the card electrically connects with the electrical connector.

2. An insertion and ejection device as claimed in claim 1, wherein the driving mechanism includes an electric motor coupled to a gear train having a driving gear, a card driving member coupled to said driving gear for engaging a side of the card for moving the card along the card movement path.

3. An insertion and ejection device as claimed in claim 2, wherein said mechanism further comprises a pivotally mounted actuation member, a biasing member for biasing the card driving member into the card movement path and for biasing the actuation member into engagement with a switch for operating the electric motor.

4. An insertion and ejection device as claimed in claim 2, wherein the gear train includes a low speed section and a high speed section.

5. An insertion and ejection device as claimed in claim 4, wherein the low speed section includes a pinion engagable with a rack mounted onto said card holder.

6. An insertion and ejection device as claimed in claim 4, wherein said driving gear is part of said high speed section.

7. An insertion and ejection device as claimed in claim 2, wherein said card driving member includes a gear engaging said driving gear and having a rubber roller mounted thereto.

8. An insertion and ejection device as claimed in claim 1, wherein a spring member is connected between said card guide and said card holder to maintain said card holder toward an ejection position.

9. An insertion and ejection device as claimed in claim 2, wherein said pushing arms have elongate slots in which a portion of a shaft of said driving gear and a fixed shaft are disposed, and spring members are connected to said pushing arms to bias said pushing arms outwardly.

10. An insertion and ejection device as claimed in claim 9, wherein said pushing arms have pins disposed in an upper plate of said card holder.

11. An insertion and ejection device as claimed in claim 5, wherein said card holder includes a bottom plate on which said rack is mounted, said bottom plate includes a cam groove in which a portion of a shaft of said card driving member is disposed.

12. An insertion and ejection device as claimed in claim 11, wherein said cam groove includes a sloped side moving said shaft outwardly as said card holder moves inwardly thereby separating the card driving member from the side edge of the card.

\* \* \* \* \*